(12) United States Patent
Lin et al.

(10) Patent No.: US 9,774,548 B2
(45) Date of Patent: Sep. 26, 2017

(54) INTEGRATING USER PERSONAS WITH CHAT SESSIONS

(71) Applicant: Personify, Inc., Chicago, IL (US)

(72) Inventors: Dennis Lin, Urbana, IL (US); Sumant Kowshik, Champaign, IL (US); Sanjay Patel, Urbana, IL (US)

(73) Assignee: Personify, Inc., Chicago, IL (US)

( * ) Notice: Subject to any disclaimer, the term of this patent is extended or adjusted under 35 U.S.C. 154(b) by 142 days.

(21) Appl. No.: 14/132,606

(22) Filed: Dec. 18, 2013

(65) Prior Publication Data

US 2015/0172069 A1    Jun. 18, 2015

(51) Int. Cl.
*H04N 5/272*    (2006.01)
*H04L 12/18*    (2006.01)
*G06F 3/0484*   (2013.01)
*H04L 12/58*    (2006.01)

(52) U.S. Cl.
CPC .............. *H04L 51/04* (2013.01); *H04L 51/10* (2013.01); *G06F 3/0484* (2013.01); *H04L 12/1822* (2013.01); *H04N 5/272* (2013.01); *H04N 2005/2726* (2013.01)

(58) Field of Classification Search
CPC ............ H04N 5/272; H04N 2005/2726; H04L 12/1822; G06F 3/0484
See application file for complete search history.

(56) References Cited

U.S. PATENT DOCUMENTS

| | | | |
|---|---|---|---|
| 5,001,558 A | 3/1991 | Burley et al. | |
| 5,022,085 A | 6/1991 | Cok | |
| 5,117,283 A | 5/1992 | Kroos et al. | |
| 5,227,985 A | 7/1993 | DeMenthon | |
| 5,343,311 A | 8/1994 | Morag et al. | |
| 5,506,946 A | 4/1996 | Bar et al. | |
| 5,517,334 A | 5/1996 | Morag et al. | |
| 5,534,917 A | 7/1996 | MacDougall | |
| 5,581,276 A | 12/1996 | Cipolla et al. | |
| 5,631,697 A | 5/1997 | Nishimura et al. | |
| 5,687,306 A | 11/1997 | Blank | |
| 6,119,147 A * | 9/2000 | Toomey | G06Q 10/109 709/204 |
| 6,150,930 A | 11/2000 | Cooper | |
| 6,411,744 B1 * | 6/2002 | Edwards | G06K 9/00369 345/634 |
| 6,661,918 B1 | 12/2003 | Gordon et al. | |
| 6,664,973 B1 | 12/2003 | Iwamoto et al. | |
| 6,798,407 B1 * | 9/2004 | Benman | G06T 15/04 345/419 |
| 7,124,164 B1 * | 10/2006 | Chemtob | G06Q 10/10 709/204 |
| 7,317,830 B1 | 1/2008 | Gordon et al. | |

(Continued)

OTHER PUBLICATIONS

D.S. Lee, "Effective Gaussian Mixture Leaning for Video Background Subtraction", IEEE, 6 pages, May 2005.

(Continued)

*Primary Examiner* — Eric J Bycer

(74) *Attorney, Agent, or Firm* — Invention Mine LLC

(57) ABSTRACT

Embodiments disclose extracting a user persona from a video of arbitrary duration and associating that persona with text for a chat session. Embodiments cause the persona to be extracted at the moment text is sent or received to convey the body language associated with the text.

12 Claims, 10 Drawing Sheets

(56) References Cited

U.S. PATENT DOCUMENTS

| | | | |
|---|---|---|---|
| 7,324,166 B1* | 1/2008 | Joslin | H04N 9/75 348/578 |
| 7,386,799 B1* | 6/2008 | Clanton | A63F 13/12 715/753 |
| 7,574,043 B2 | 8/2009 | Porikli | |
| 7,633,511 B2 | 12/2009 | Shum et al. | |
| 7,773,136 B2 | 8/2010 | Ohyama et al. | |
| 8,175,384 B1 | 5/2012 | Wang | |
| 8,300,890 B1 | 10/2012 | Gaikwad et al. | |
| 8,320,666 B2 | 11/2012 | Gong | |
| 8,379,101 B2 | 2/2013 | Mathe | |
| 8,396,328 B2 | 3/2013 | Sandrew et al. | |
| 8,565,485 B2 | 10/2013 | Craig | |
| 8,649,592 B2 | 2/2014 | Nguyen | |
| 8,649,932 B2 | 2/2014 | Mian et al. | |
| 8,818,028 B2 | 8/2014 | Nguyen | |
| 8,913,847 B2 | 12/2014 | Tang et al. | |
| 2002/0158873 A1 | 10/2002 | Williamson | |
| 2003/0228135 A1* | 12/2003 | Illsley | H04N 5/272 386/285 |
| 2004/0107251 A1* | 6/2004 | Wat | H04L 12/1813 709/204 |
| 2004/0153671 A1 | 8/2004 | Schuyler et al. | |
| 2005/0094879 A1 | 5/2005 | Harville | |
| 2005/0151743 A1* | 7/2005 | Sitrick | G09G 5/377 345/473 |
| 2007/0110298 A1 | 5/2007 | Graepel et al. | |
| 2007/0146512 A1 | 6/2007 | Suzuki et al. | |
| 2007/0201738 A1 | 8/2007 | Toda et al. | |
| 2007/0242161 A1* | 10/2007 | Hudson | H04N 5/272 348/586 |
| 2008/0181507 A1 | 7/2008 | Gope et al. | |
| 2009/0030988 A1* | 1/2009 | Kuhlke | G06Q 10/107 709/206 |
| 2009/0033737 A1* | 2/2009 | Goose | G06F 3/0481 348/14.07 |
| 2009/0044113 A1* | 2/2009 | Jones | G06T 13/40 715/707 |
| 2009/0110299 A1 | 4/2009 | Panahpour Tehrani et al. | |
| 2009/0199111 A1* | 8/2009 | Emori | G06T 13/00 715/758 |
| 2009/0244309 A1 | 10/2009 | Maison et al. | |
| 2010/0027961 A1* | 2/2010 | Gentile | G06T 5/50 386/278 |
| 2010/0195898 A1 | 8/2010 | Bang et al. | |
| 2011/0193939 A1 | 8/2011 | Vassigh et al. | |
| 2011/0242277 A1 | 10/2011 | Do | |
| 2011/0243430 A1 | 10/2011 | Hung et al. | |
| 2011/0267348 A1 | 11/2011 | Lin et al. | |
| 2011/0293179 A1 | 12/2011 | Dikmen et al. | |
| 2014/0156762 A1* | 6/2014 | Yuen | H04L 51/32 709/206 |
| 2014/0229850 A1* | 8/2014 | Makofsky | G06F 3/0484 715/747 |
| 2015/0052462 A1* | 2/2015 | Kulkarni | G06F 3/04817 715/765 |

OTHER PUBLICATIONS

Benezeth et al., "Review and Evaluation of Commonly-Implemented Background Subtraction Algorithms", 4 pages, 2008.

Piccarrdi, "Background Subtraction Techniques: A Review", IEEE, 6 pages, 2004.

Cheung et al., "Robust Techniques for Background Subtraction in Urban Traffic Video", 11 pages, 2004.

Kolmogorov et al., "Bi-Layer Segmentation of Binocular Stereo Vision", IEEE, 7 pages, 2005.

Gvli et al., "Depth Keying", 2003, pp. 564-573.

Crabb et al., "Real-Time Foreground Segmentation via Range and Color Imaging", 4 pages, 2008.

* cited by examiner

INTEGRATING USER PERSONAS WITH CHAT SESSIONS

FIELD OF THE INVENTION

Embodiments of the present invention relate to the field of video processing, and more specifically towards systems and methods for integrating user personas with other display content during chat sessions.

BACKGROUND

Conventional video conferencing techniques typically employ a camera mounted at one location and directed at a user. The camera acquires an image of the user and background of the user that is then rendered on the video display of another user. The rendered image typically depicts the user, miscellaneous objects, and background that are within the field-of-view of the acquiring camera. For example, the camera may be mounted on the top edge of a video display within a conference room with the user positioned to view the video display. The camera field-of-view may encompass the user and, in addition, a conference table, chairs, and artwork on the wall behind the user, (i.e., anything else within the field-of-view). Typically, the image of the entire field-of-view is transmitted to the video display of a second user. Thus, much of the video display of the second user is filled with irrelevant, distracting, unappealing, or otherwise undesired information. Such information may diminish the efficiency, efficacy, or simply the esthetic of the video conference. This reduces the quality of the user experience.

Conventional chat sessions involve the exchange of text messages. Mere text messages lack the ability to convey certain types of information, such as facial features, other gestures, or general body language expressed by the participants. Conventional video conferencing techniques may convey images of the participants, but, as discussed above, the video conferencing medium has several shortcomings.

Furthermore, typical video conferencing and chat techniques do not incorporate the user with virtual content (e.g., text) being presented, and the traditional capture of the user and surrounding environment is usually unnatural and unattractive when juxtaposed against virtual content. Such a display further removes the exchange from conveying the impression that the exchange is face-to-face.

SUMMARY

The systems and computer-implemented methods disclosed herein are for associating extracted images of users with content during a chat session. In one of many embodiments, a method includes creating a first scene by receiving content, such as text, from a user. A persona is created for that user and is associated with the content. This persona is created by extracting the image of the user from a video frame. Thus, in this embodiment, the persona is motionless (e.g., an image). The persona is preferably extracted from a video frame that captures the facial expression, gestures, or other body language of the user when the user was creating the content. Such a persona would generally add to the information conveyed by conveying the user's general attitude or emotion along with the content. The associated content and persona are then displayed in the chat session.

DETAILED DESCRIPTION

In the following description, numerous details and alternatives are set forth for the purpose of explanation. However, one of ordinary skill in the art will realize that embodiments may be practiced without the use of these specific details. In other instances, well-known structures and devices are shown in block diagram form to avoid obscuring the embodiments with unnecessary detail.

According to an embodiment, a user persona connotes an image of the user without surrounding background. The persona may be from, e.g., a single motionless video frame, a series of still frames (e.g., a stop-motion animation), or a video. Integrating a still frame (e.g., a "snapshot"), or a series of frames or short video (e.g., a "clip") of a user persona with the text may improve the effect of a chat session (e.g., "texting") by conveying the expressions, gestures, and general body language of the user near the time the session content was sent—effectively a custom emoticon. Grouping multiple personas on a display simulates face-to-face interactions and creates a more immediate, natural, and even visceral experience. The inventive systems and methods within may extract the persona of the user from the field-of-view of the acquiring camera and incorporate that persona into chat sessions on the displays of the users during a chat session. Accordingly, it is highly desirable to integrate user personas with content during chat sessions. Methods for extracting a persona from a video were published in application Ser. No. 13/076,264 (filed Mar. 20, 2011, by Minh N. Do, et al.) and Ser. No. 13/083,470 (filed Apr. 8, 2011, by Quang H. Nguyen, et al.), each of which is incorporated herein in its entirety by reference.

Figure 1:
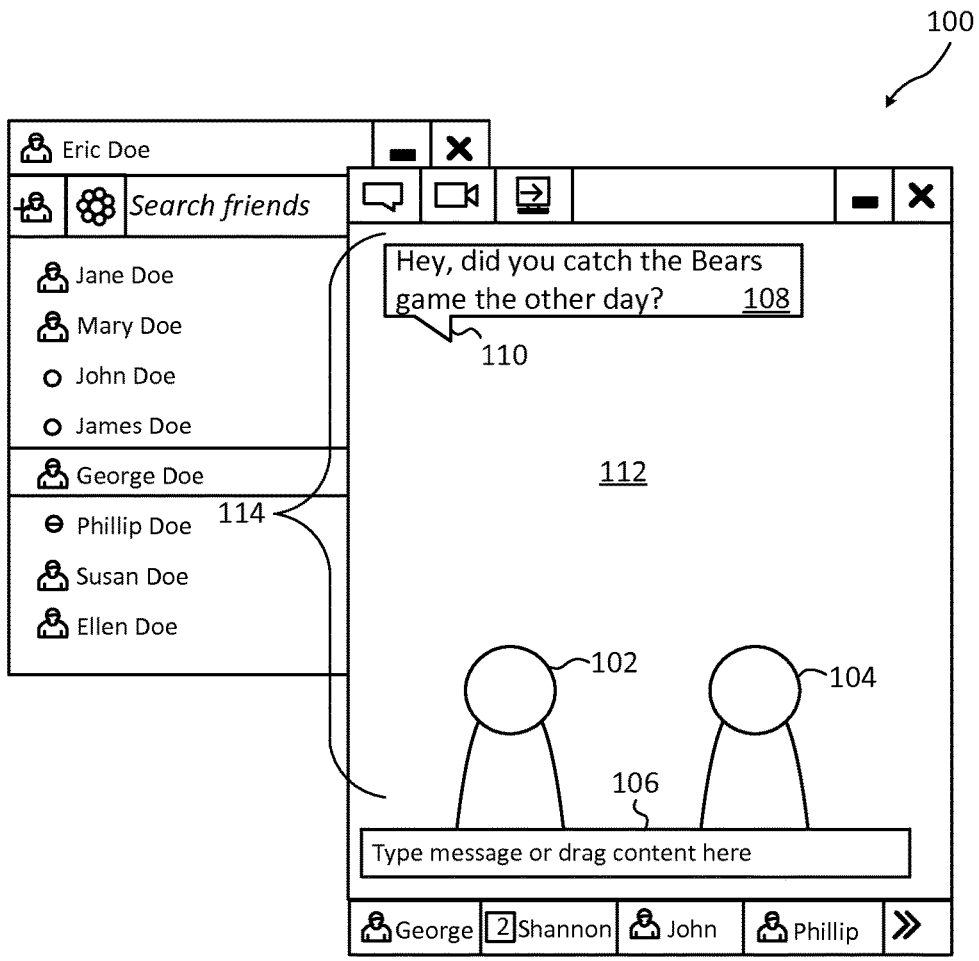
FIG. 1 illustrates an example chat session in accordance with some embodiments.

FIG. 1 illustrates an example chat session 100 in accordance with some embodiments. In FIG. 1, during chat session 100, personas 102 and 104 are created to accompany a content balloon 108 and embedded within a background feed 112. The creation of personas 102 and 104 is discussed further within, particularly within the discussion related to FIGS. 4-7. In this embodiment, the personas are rendered horizontally as shown within background feed 112. The arrangement and the absence of boxes, frames, or other boundary between personas 102 and 104 and background feed 112 increases the impression that the exchange is face-to-face. Such an effect would be difficult to achieve should one persona be rendered floating above the other, or as obviously disembodied heads. In other embodiments, special effects change the appearance of the persona while retaining the facial expression, or gesture. Such appearance changes may be realized using many methods, such as overlays or computer graphics. Under such other circumstances, floating or disembodied personas may be entirely appropriate and effective. Similarly, in an embodiment, background feed 112 may be themed, e.g., it may be made to resemble a graphic novel, or serialized comic. Continuing with FIG. 1, a new content window 106 receives text or other content such as an image from a user (not shown). Content that has been entered is displayed in content balloon 108 with an indicator 110 indicating that content balloon 108 was entered by the user (not shown) associated with persona 102. The combination of content balloon 108 and persona 102 may be considered a scene 114. Hereinafter and unless stated otherwise, for convenience, content will be attributed to a persona even though it was actually entered by the user represented by the persona.

In the embodiment, persona 104 is a snapshot of the respective user created at the initiation of chat session 100. Personas 102 and 104 may initially be a snapshot or clip representing the user at the time the user was invited to the session. Alternatively, personas 102 and 104 may be pre-existing snapshots, clips, or other images chosen to represent the user at the initiation of a chat session. In FIG. 1, persona 102 represents the user at a moment relating to their creating content balloon 110. For example, persona 102 may be a persona created at the moment the user created content balloon 110, e.g., by clicking "enter." Persona 102 may also represent the moment the user choose to reply to a previous content balloon (not shown), e.g., by clicking "reply." In addition to any such keyboard-related user input, persona 102 may represent the user upon the system detecting a change in user facial expression or other physical gesture.

In an embodiment, before the creation of content balloon 110, the user is given the option of approving the persona that is to be depicted along with content balloon 110. In the event that the user is dissatisfied with the prospective persona, the user is given the option to create a different persona. In this case persona 102 could be a pose assumed by the user for a snapshot, or series of facial expressions, gestures, or other motions in a clip. Such a persona would no longer be as contemporaneous with the content, but would perhaps convey an expression or body language preferred by the user. The ability of the user to edit the persona may also reduce user anxiety about being "caught on camera" and potentially creating a faux pas. Personas 102 and 104 are updated throughout the chat session upon the sending of new content, adding information conveyed by facial expressions and body language with each new content balloon, and, as a result, adding to the impression that the chat session is held face-to-face.

In addition to snapshots, persona 102 may be a video clip of an arbitrary length, i.e., a moving persona. The moving persona (not shown) may capture the user for an arbitrary period before the creation of a content balloon. In addition, the user may be given the option to approve the moving persona or create a different moving persona as discussed above.

Figure 2:
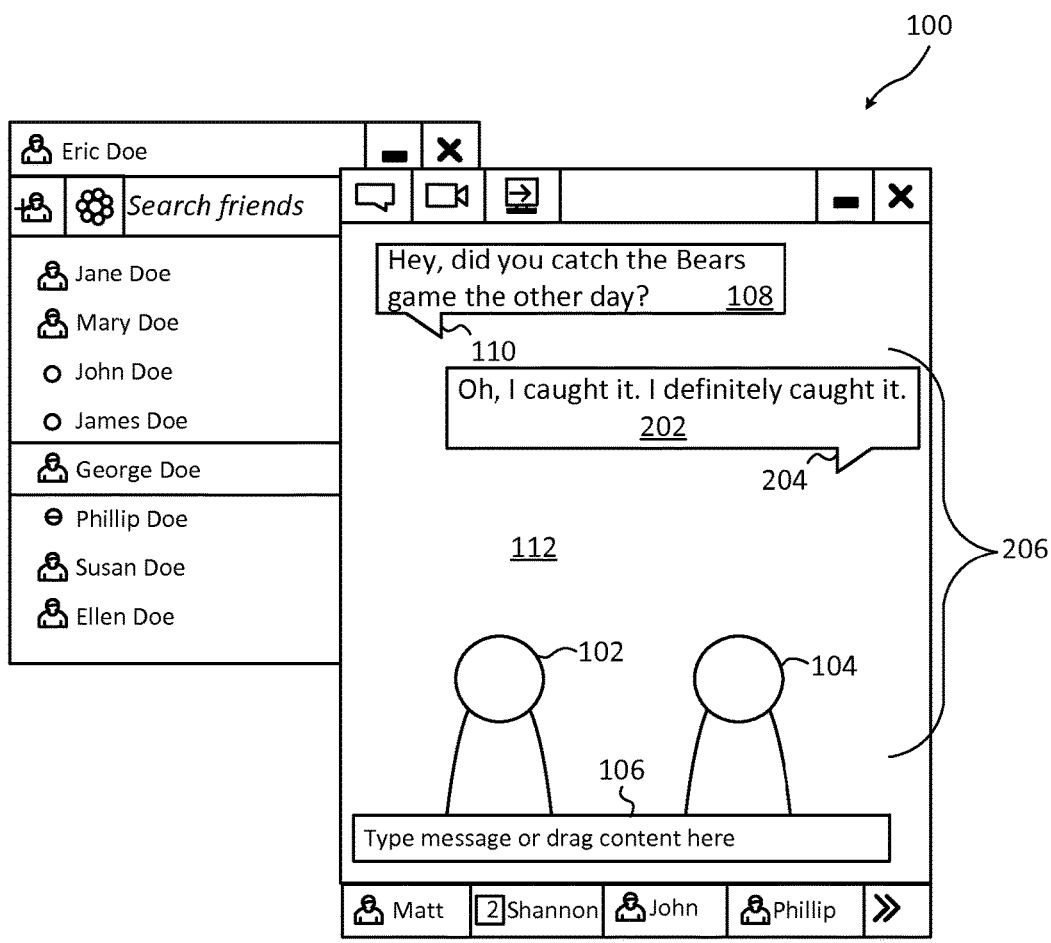
FIG. 2 illustrates an example chat session in accordance with some embodiments.

FIG. 2 illustrates an example chat session in accordance with some embodiments. In FIG. 2, the user represented by persona 104 has entered content in new content window 106. The new content is shown displayed in content balloon 202 ("Oh, I caught it. I definitely caught it.") and attributed to persona 104 by indicator 204. Persona 104 represents the user at a moment the user created content balloon 202, but persona 104 may be any of the alternatives discussed with reference to persona 102. In FIG. 2, by being placed closest to personas 102 and 104, content balloon 202 represents the most recent addition to the chat session. In the embodiment, previous content balloons are displayed above more recent content balloons. Thus, the addition of a new content balloon may force a previous balloon out of the display. However, such previous content balloons will be retained and may be revisited by scrolling up through prior content balloons. This may force the more recent content balloons below and off the display. However, in an embodiment, the creation of a new content balloon will automatically scroll the content balloons so that the new content balloon will be visible.

In FIG. 2, personas 102 and 104 represent the users at the time the users created content balloons 108 and 202, respectively. In the embodiment, should either user enter new content, their corresponding persona 102 or 104 would change with the addition of the new content. In an embodiment, past versions (not shown) of personas 102 and 104 are retained and associated with the content balloon that was created along with the past version of the persona. In this embodiment, should a user select a content balloon (e.g., by "clicking on") the persona that accompanied that user balloon will be displayed. Thus, a user may scroll back, or rewind, to the beginning of a chat and by selecting different content balloons display the personas that accompanied those content balloons. In an embodiment, scrolling through the content balloons causes the associated personas to change, while remaining in the same position across the bottom of the display. If done in chronological order, i.e., selecting each content balloon in the order in which they were created, personas 102 or 104 will change to show the progression of the personas during the chat session.

Regarding FIG. 2, in an embodiment, a series of content balloons, such as 108 and 202, may be selected and saved as a chat segment and exported and shared as a separate file for a number of uses, e.g., independent viewing, or embedding within a social media site. Saving a series of content balloons also saves the persona that accompanied each associated content balloon. Thus, when the chat segment is accessed and a particular content balloon selected, the persona that accompanied that content balloon will be displayed. In this manner, the chat segment may be viewed in chronological order or otherwise, as discussed above. The viewing of these chat sessions may be dynamic—in which the content balloons and associated personas are presented automatically as a slide show—or instant—in which all content balloons and associated personas are visible.

In an embodiment, a persona is created to accompany both the creation of a content balloon and the receipt of a content balloon. The manner of creating a persona upon receipt of a content balloon may be as discussed with respect to personas created upon the creation of a content balloon, (e.g., based on keyboard entry, facial expressions, or other physical gestures). Thus, reactions from both the sender and receiver of a particular content balloon may be evidenced and displayed by their personas. In addition, the persona feature of a chat session may be disabled, should the nature of the chat session warrant this.

Figure 3:
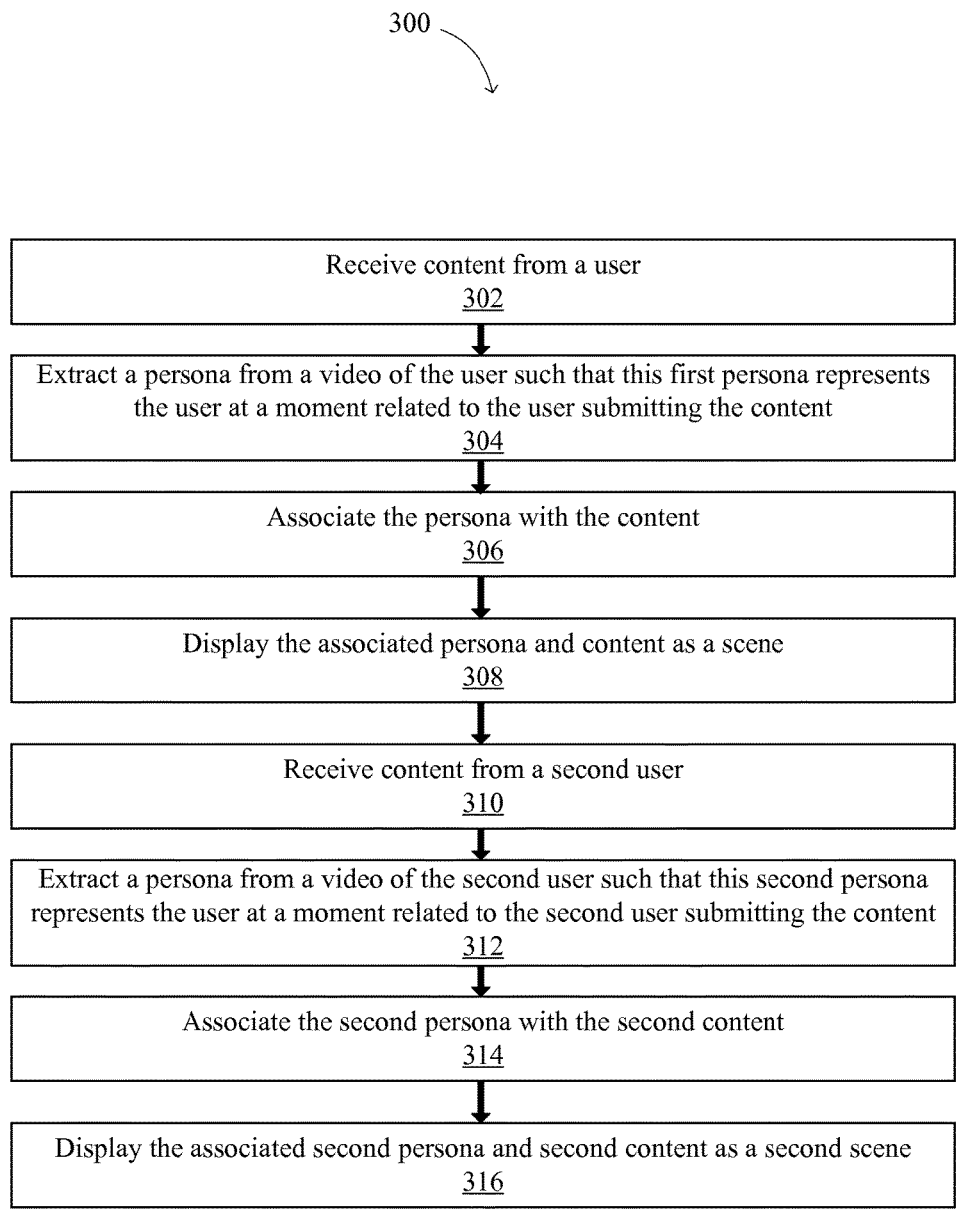
FIG. 3 is a flow diagram illustrating a method in accordance with some embodiments.

FIG. 3 is a flow diagram illustrating a method 300 in accordance with some embodiments. At 302 content is received, for example, by a user typing into new content window 106. At 304, persona 102 is extracted from a chosen video, video frame or other still photo. The chosen video, video frame, or still photo may correspond to a moment during the user's entering text into new content window 106, such as the user selecting to enter text typed into new content window 106. Preferably, the moment is chosen so that persona 102 captures the user's facial expression, gesture, or other body language that is related to the new content. At 306, the content, e.g., content balloon 108, is associated with the persona, e.g., persona 102. At 308, the associated content balloon 108 and persona 102 are embedded within background feed 112 and displayed as a scene. At this point persona 104 represents an initial or default persona for the corresponding user, since the user has not yet contributed content to the chat session. In an embodiment, a user may be represented by a persona created upon the user accepting the invitation to the chat session. At 310, second content is received, for example, by any user typing into new content window 106. In this example, the second content is received by the user associated with persona 104. At 312, persona 104 is extracted from a chosen video, video frame, or other still photo. As with persona 102, the chosen video, video frame, or still photo may correspond to a moment during the user's entering text into new content window 106. Preferably, the moment is chosen so that persona 104 captures the user's facial expression, gesture, or other body language that is related to the new content. At 314, the content, e.g., content balloon 202, is associated with the persona, e.g., persona 104. At 316, the associated content balloon 202 and persona 104 are embedded within background feed 112 and displayed as a scene 206. To facilitate the ability to review some portion of the chat session, displaying scene 206 causes content balloon 108 (and any previous content balloons (not shown)) to scroll up to accommodate content balloon 202. In an embodiment, new content windows overlap previous content windows. In such a configuration, the previous content windows may be selected at which point they are uncovered for viewing.

Figure 4:
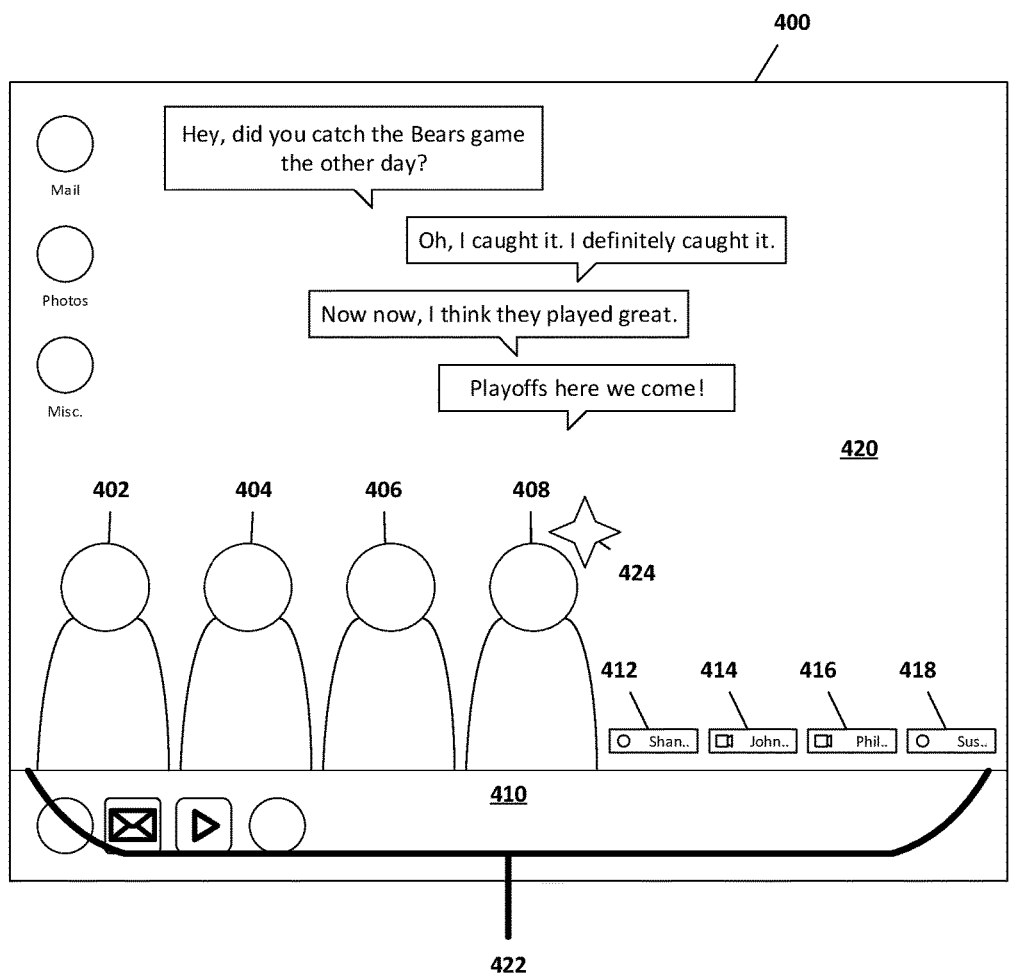
FIG. 4 illustrates an example chat session in accordance with some embodiments.

FIG. 4 illustrates an example chat session 400 in accordance with some embodiments. In FIG. 4, personas 402, 404, 406, and 408, are arranged behind a virtual conference table 410 along with identifiers 412, 414, 416, and 418, all of which are embedded within background feed 420. In this example, background feed 420 is the default Windows™ screen. Dais symbol 424 signifies the persona representing the user whose display is being shown in FIG. 4. In this case persona 408 represents the user whose display is shown in FIG. 4. Identifiers 412, 414, 416, and 418 represent users without the apparatus necessary to create personas. Such users may still initiate or join chat sessions with users who are equipped to create personas, so long as their apparatus is able to display images and not merely text.

At the displayed instant of chat session 400, every user, whether represented by a persona or an identifier, has accepted the invitation to the chat session. Thus, the combined list of personas 402-408 and identifiers 412-418 is a deck 422 of users who may be chatted with, or "summoned," by selecting their persona or identifier. Personas 402-408 and identifiers 412-418 may be removed from deck 422. And each individual user may remove themselves, in this case persona 408 as indicated by 424. The removal of a persona from the deck of one user will be limited to that user's deck and not cause that same persona to be removed from all other decks involved in chat session 400. In an embodiment, should a user remove a contact from deck 422, that user would be symmetrically removed from the deck of the removed contact. For example, should the user represented by persona 408 remove persona 406 from deck 422, then persona 408 would be removed from the deck (not shown) of the display of the user represented by persona 406.

At the displayed instant, content has been entered by each of the users represented by personas 402-408 and none of the users represented by identifiers 412-418. Should no user make an entry for an arbitrary time, the chat session may enter a "stand-by mode." In stand-by mode, any user may activate chat session 400 by selecting a persona or identifier. Upon selecting a persona or identifier, a new content window 106 (not shown) will appear and chat session 400 could continue as described with reference to FIGS. 1-3. While chat session 400 is in stand-by mode, however, personas 402-408 will be updated at arbitrary but regular intervals, e.g., every 10, 30, or 60 seconds. Such regular updating serves to give an indication of the users' current availability (by, for example, the presence or absence of a persona) and activity level without creating the distraction of a continuously-running video stream. Such updating may also be made variable depending on available bandwidth.

Also regarding an indicator of a user's current availability, a placeholder indicating a user's absence could be used. This would be a positive indication of a user's absence, which may be preferable to the mere absence of a persona. Such a placeholder may, for example, be graphic or textual or a combination of the two. A graphic placeholder may include a silhouette with a slash through it, or an empty line drawing of a previous persona of the user. And a textual placeholder may include "unavailable" or "away."

In an embodiment, only the users involved in an active chat session will leave stand-by mode. That is, a persona remains in stand-by mode until the respective user creates or receives a content balloon.

Figure 5:
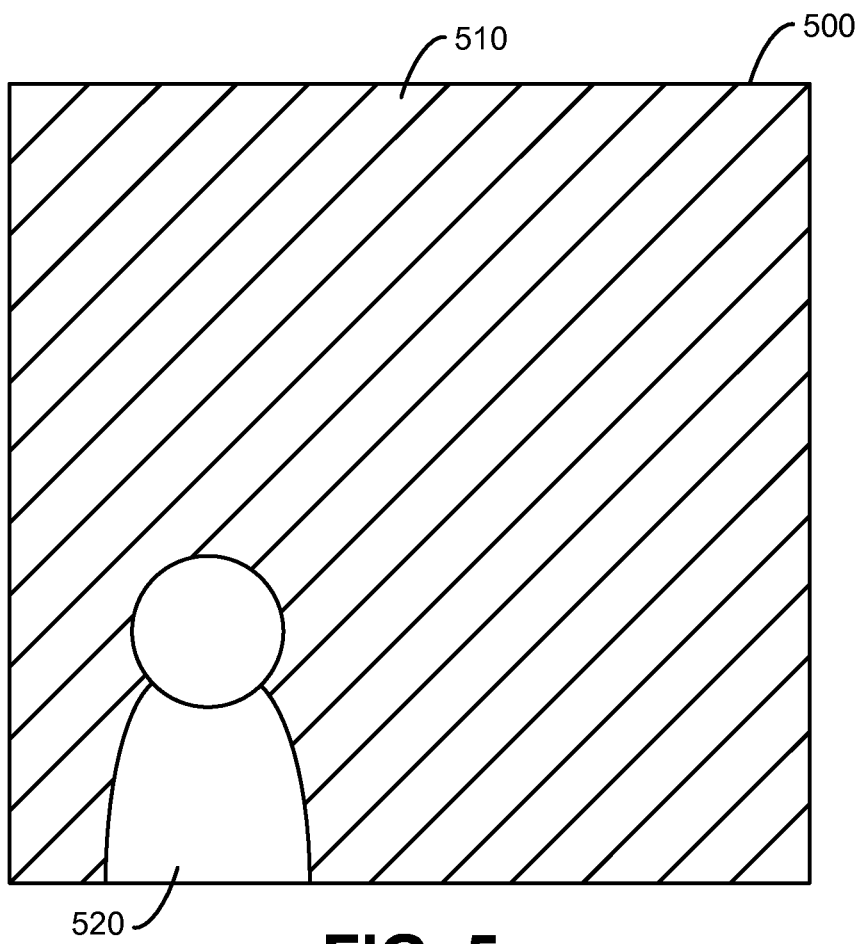
FIG. 5 illustrates an example video comprising a background portion and a foreground portion in accordance with some embodiments.

Creating a persona by extracting a user image from a video will now be described regarding FIGS. 5, 6, 7, and 8. FIG. 5 illustrates an example video 500. In general, the example video 500 comprises a background portion 510 and a persona 520. For example, the background portion 510 may comprise a wall, outdoor scene, or any other background scene and the persona 520 may comprise a human user or presenter. However, the persona 520 may comprise any identifiable object or entity. Thus, the example video 500 may be divided into at least two portions—a background 510 and a persona 520. For example, if the video 500 comprises a user typing on a keyboard, then the user may comprise the persona 520 and a wall of the room behind may comprise the background portion 510.

Figure 6:
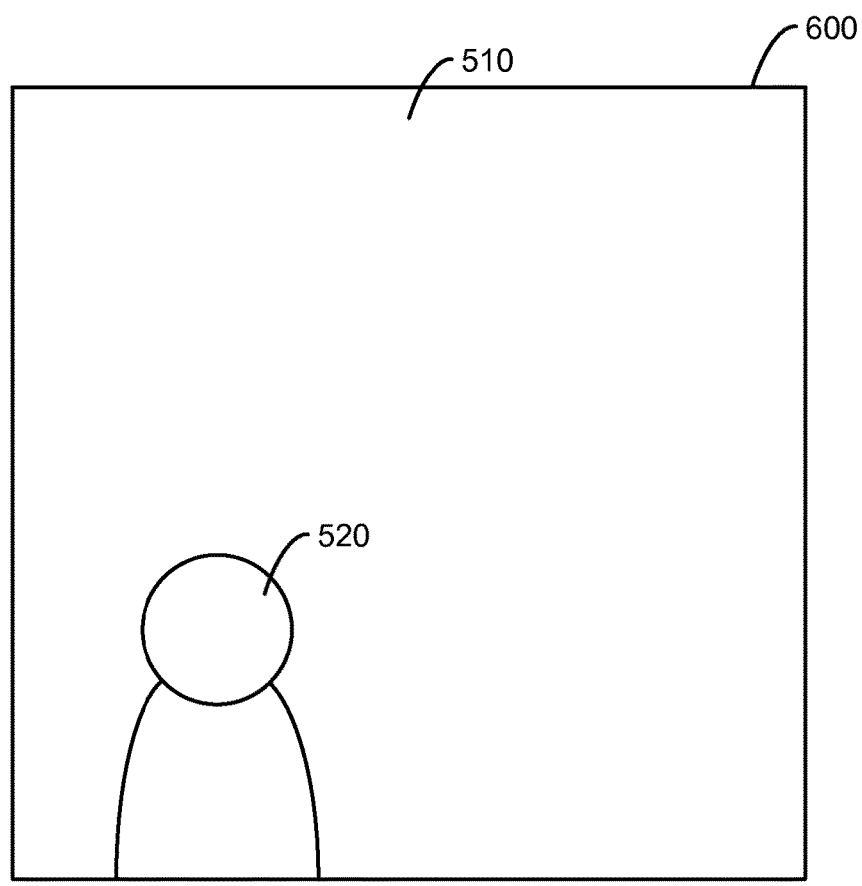
FIG. 6 illustrates an example video with the background portion subtracted or removed.

FIG. 6 illustrates an example foreground video 600. In general, foreground video 600 comprises a persona 520 of the video 500 with the background portion 510 subtracted or removed. In this regard, foreground video 600 approximates the video 500 with the removal or subtraction of the background portion 510. Persona 520 may be selected as segments of foreground video 600 of arbitrary length, including a single frame. A persona created from single foreground video frame may allow the user to convey an expression or body language, and a persona created from a video clip may allow the user to convey a gesture or action. These segments may be saved in foreground video libraries (not shown). During a chat session, persona 520 may be created and viewed by the user, but not sent to other members of the chat session until directed to be associated with content by the user. That direction may take a number of forms. It may be a keystroke entry directly associated with sending a text, such as "enter." The direction may also be indirectly related to the sending of content. For example, a user could peruse through an existing library of personas to select an arbitrary section of a persona video or create a new persona.

Figure 7:
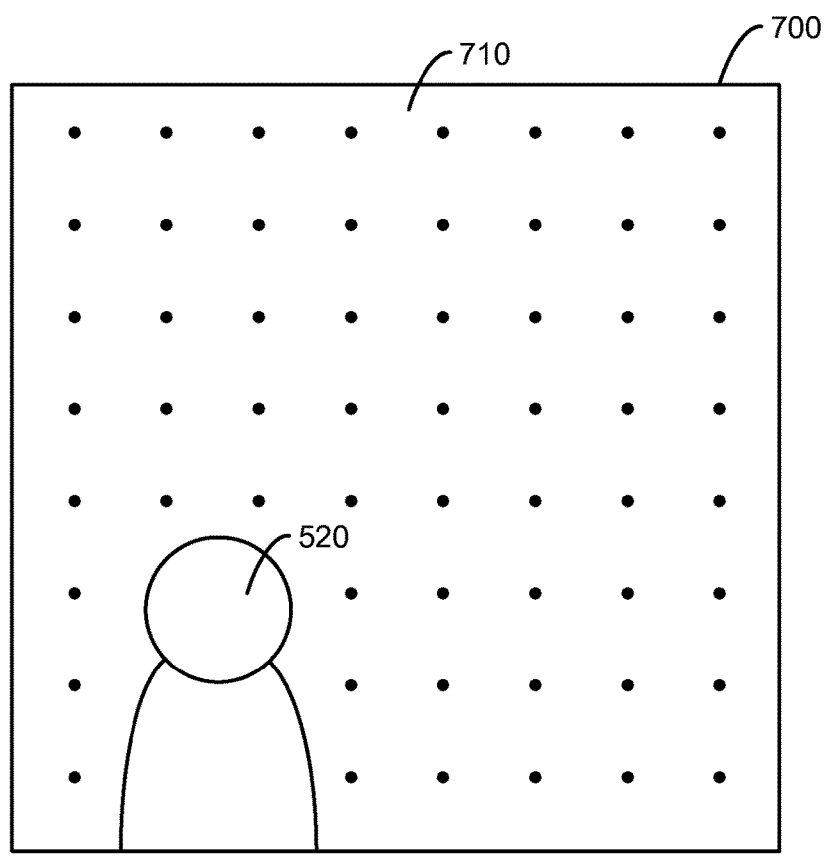
FIG. 7 illustrates an example composite video comprising a foreground video with a background feed in accordance with some embodiments.

FIG. 7 illustrates an example composite video 700. In general, the composite video 700 comprises the persona 520 embedded within a background feed 710. For example, the persona 520 may comprise a single frame of a user and the background feed 710 may comprise text. In some embodiments, the background feed 710 may comprise any or all of an image, a presentation slide, web content, shared desktop, another video, pre-recorded video stream, live video stream, and/or a 3D virtual scene. And composite video 700 may be of arbitrary length, including a single frame. In addition, composite video 700 may be created by receiving persona 520 and background feed 710 from different sources. In such a case, persona 520 would be sent to the receiver without a background feed 710.

Figure 8:
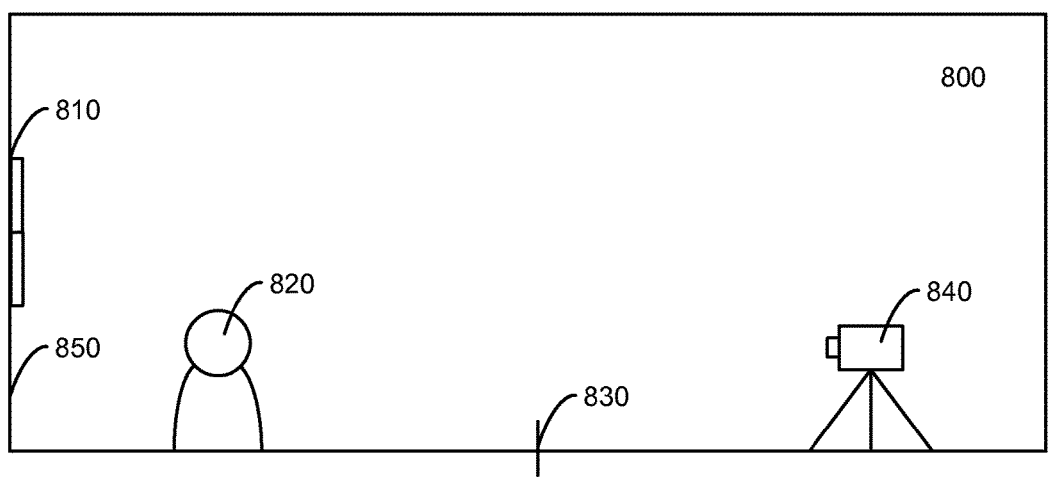
FIG. 8 illustrates an example setup comprising illustrates an example setup comprising a threshold for displaying the foreground video with the background feed in accordance with some embodiments.

FIG. 8 illustrates an example setup 800 for displaying the foreground video frame with the background feed in accordance with some embodiments. As seen in FIG. 8, a setup 800 may comprise a camera 840 capable of receiving depth information and color information (e.g., a 3D camera). The setup 800 may further comprise a user presenter 820 in front of a wall or background 850. In some embodiments, the camera 840 may receive a depth and color video of the user presenter 820 in front of the background 850. The camera 840, or a connected computer system as discussed in further detail below, may subtract or remove the background 850 so as to create a foreground video. The foreground video may then be embedded into a background feed, and perhaps the background feed is shown on display 810. For example, a single frame from the foreground video comprising a persona 520 representing the user presenter 820 may be embedded into text frame in a chat session.

Figure 9:
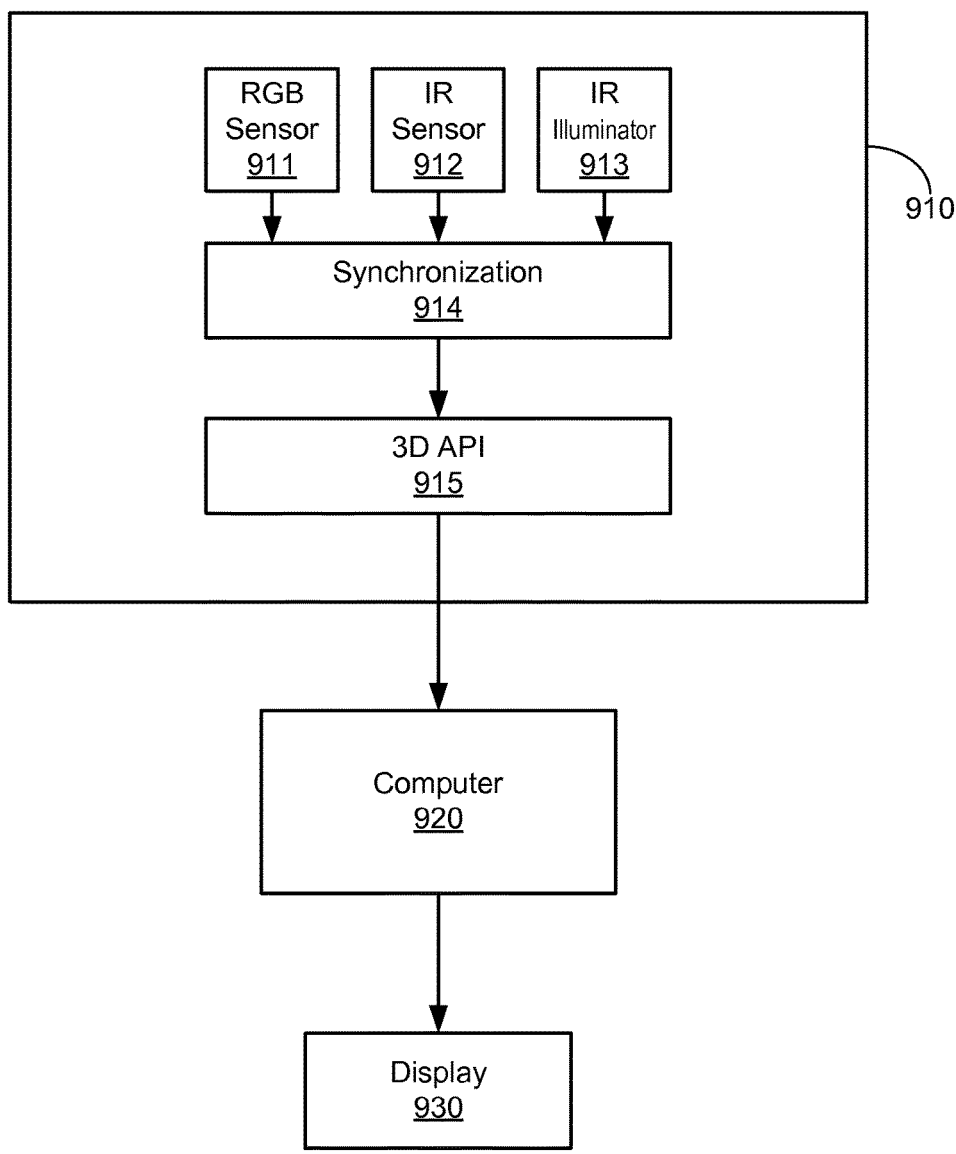
FIG. 9 illustrates an embodiment of a camera system for foreground video embedding in accordance with some embodiments.

FIG. 9 illustrates an embodiment of a camera system 900 for the foreground video embedding systems and methods of the present embodiment. In general, the camera system 900 comprises a camera 910, computer 920, and display 930.

As seen in FIG. 9, a camera 910 is connected to a computer 920. The camera 910 may comprise a three dimensional (3D) camera, depth camera, z-camera and/or range camera. In some embodiments, the camera 910 may be comprised of a color or RGB camera and a depth camera or may comprise of a single camera with an RGB sensor and depth sensor. As such, the camera 910 receives color information and depth information. The received color information may comprise information related to the color of each pixel of a video. In some embodiments, the color information is received from a Red-Green-Blue (RGB) sensor 911. As such, the RGB sensor 911 may capture the color pixel information in a scene of a captured video image. The camera 910 may further comprise an infrared sensor 912 and an infrared illuminator 913. In some embodiments, the infrared illuminator 913 may shine an infrared light through a lens of the camera 910 onto a scene. As the scene is illuminated by the infrared light, the infrared light will bounce or reflect back to the camera 910. The reflected infrared light is received by the infrared sensor 912. The reflected light received by the infrared sensor results in depth information of the scene of the camera 910. As such, objects within the scene or view of the camera 910 may be illuminated by infrared light from the infrared illuminator 913. The infrared light will reflect off of objects within the scene or view of the camera 910 and the reflected infrared light will be directed towards the camera 910. The infrared sensor 912 may receive the reflected infrared light and determine a depth or distance of the objects within the scene or view of the camera 910 based on the reflected infrared light.

In some embodiments, the camera 910 may further comprise a synchronization module 914 to temporally synchronize the information from the RGB sensor 911, infrared sensor 912, and infrared illuminator 913. The synchronization module 914 may be hardware and/or software embedded into the camera 910. In some embodiments, the camera 910 may further comprise a 3D application programming interface (API) for providing an input-output (IO) structure and interface to communicate the color and depth information to a computer system 920. The computer system 920 may process the received color and depth information and comprise and perform the systems and methods disclosed herein. In some embodiments, the computer system 920 may display the foreground video embedded into the background feed onto a display screen 930.

Figure 10:
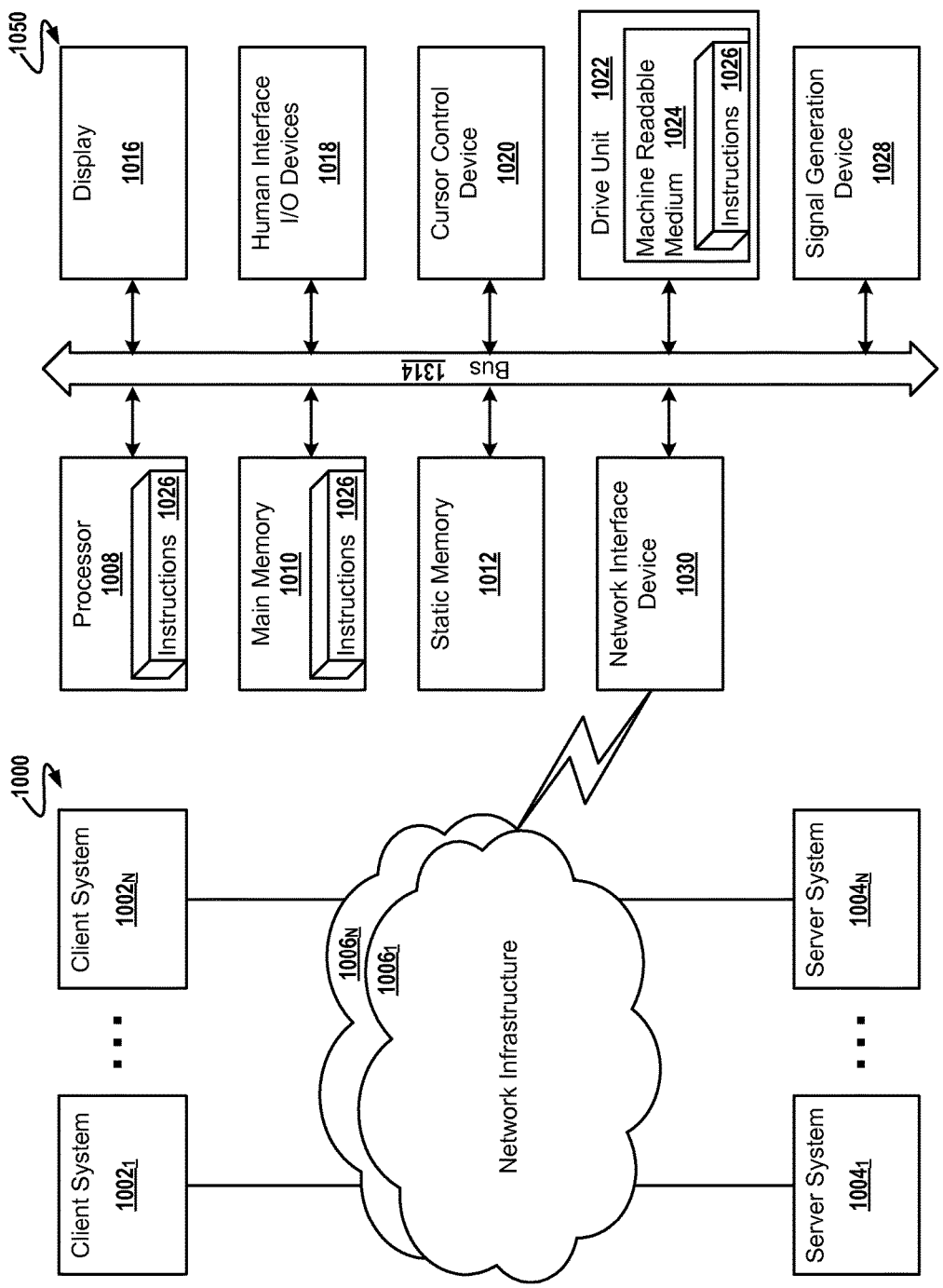
FIG. 10 illustrates an embodiment of a computer system and network system that incorporates foreground video embedding systems and methods.

FIG. 10 is a diagrammatic representation of a network 1000, including nodes for client computer systems $1002_1$ through $1002_N$, nodes for server computer systems $1004_1$ through $1004_N$, nodes for network infrastructure $1006_1$ through $1006_N$, any of which nodes may comprise a machine 1050 within which a set of instructions for causing the machine to perform any one of the techniques discussed above may be executed. The embodiment shown is purely exemplary, and might be implemented in the context of one or more of the figures herein.

Any node of the network 1000 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In some embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1050 includes a processor 1008 (e.g. a processor core, a microprocessor, a computing device, etc.), a main memory 1010 and a static memory 1012, which communicate with each other via a bus 1014. The machine 1050 may further include a display unit 1016 that may comprise a touch-screen, or a liquid crystal display (LCD), or a light emitting diode (LED) display, or a cathode ray tube (CRT). As shown, the computer system 1050 also includes a human input/output (I/O) device 1018 (e.g. a keyboard, an alphanumeric keypad, etc.), a pointing device 1020 (e.g. a mouse, a touch screen, etc.), a drive unit 1022 (e.g. a disk drive unit, a CD/DVD drive, a tangible computer readable removable media drive, an SSD storage device, etc.), a signal generation device 1028 (e.g. a speaker, an audio output, etc.), and a network interface device 1030 (e.g. an Ethernet interface, a wired network interface, a wireless network interface, a propagated signal interface, etc.).

The drive unit 1022 includes a machine-readable medium 1024 on which is stored a set of instructions (i.e. software, firmware, middleware, etc.) 1026 embodying any one, or all, of the methodologies described above. The set of instructions 1026 is also shown to reside, completely or at least partially, within the main memory 1010 and/or within the processor 1008. The set of instructions 1026 may further be transmitted or received via the network interface device 1030 over the network bus 1014.

It is to be understood that embodiments may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present embodiment has been described in terms of specific exemplary embodiments, it will be appreciated that various modifications and alterations might be made by those skilled in the art without departing from the spirit and scope of the invention. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A computer-implemented method for combining extracted personas with respective associated content during a chat session, the method comprising:
    displaying a first-user persona associated with a first user and at least a second-user persona associated with a second user;
    creating a plurality of first-user scenes, wherein creating a given first-user scene comprises:
        receiving respective first-user content-balloon text;
        extracting a respective contemporaneous first-user persona from a first video of the first user responsive to receiving the respective first-user content-balloon text; and
        associating the respective contemporaneous first-user persona with the respective first-user content-balloon text so as to associate a respective expression of the first user with the respective first-user content-balloon text;
    transmitting the respective first-user content-balloon texts and the respective contemporaneous first-user personas associated with the plurality of first-user scenes into the chat session;
    sequentially displaying the plurality of first-user scenes, wherein displaying a given first-user scene comprises (i) serially displaying the respective first-user content-balloon text and (ii) updating the displayed first-user persona with the respective contemporaneous first-user persona that is associated with the respective first-user content-balloon text;
    receiving a plurality of second-user scenes, wherein a given second-user scene associates a respective contemporaneous second-user persona from a second video of the second user with respective second-user content-balloon text; and
    sequentially displaying the plurality of second-user scenes together with the displayed plurality of first-user scenes, wherein displaying a given second-user scene comprises (i) serially displaying the respective second-user content-balloon text and (ii) updating the displayed second-user persona with the respective contemporaneous second-user persona that is associated with the respective second-user content-balloon text.

2. The computer-implemented method of claim 1, further comprising receiving a contemporaneous first-user-persona approval for the respective contemporaneous first-user persona prior to updating the displayed first-user persona with the respective contemporaneous first-user persona and prior to transmitting the respective contemporaneous first-user persona.

3. The computer-implemented method of claim 1, further comprising receiving a selection corresponding to a displayed instance of first-user content-balloon text that is associated with a previously-displayed first-user persona, and responsively updating the displayed first-user persona with the previously-displayed first-user persona.

4. The computer-implemented method of claim 1, further comprising creating a textless scene in response to detecting a facial expression or physical gesture of the first user, wherein no first-user content-balloon text is received in connection with the textless scene, such that the textless scene contains a first-user persona representing the first user without associated first-user content-balloon text.

5. A non-transient computer-readable medium comprising a set of instructions which, when executed by a computer, combine extracted personas with respective associated content during a chat session, said set comprising instructions for:
    displaying a first-user persona associated with a first user and at least a second-user persona associated with a second user;
    creating a plurality of first-user scenes, wherein creating a given first-user scene comprises:
        receiving respective first-user content-balloon text;
        extracting a respective contemporaneous first-user persona from a first video of the first user responsive to receiving the respective first-user content-balloon text; and
        associating the respective contemporaneous first-user persona with the respective first-user content-balloon text so as to associate a respective expression of the first user with the respective first-user content-balloon text;
    transmitting the respective first-user content-balloon texts and the respective contemporaneous first-user personas associated with the plurality of first-user scenes into the chat session;
    sequentially displaying the plurality of first-user scenes, wherein displaying a given first-user scene comprises (i) serially displaying the respective first-user content-balloon text and (ii) updating the displayed first-user persona with the respective contemporaneous first-user persona that is associated with the respective first-user content-balloon text;

receiving a plurality of second-user scenes, wherein a given second-user scene associates a respective contemporaneous second-user persona from a second video of the second user with respective second-user content-balloon text; and sequentially displaying the plurality of second-user scenes together with the displayed plurality of first-user scenes, wherein displaying a given second-user scene comprises (i) serially displaying the respective second-user content-balloon text and (ii) updating the displayed second-user persona with the respective contemporaneous second-user persona that is associated with the respective second-user content-balloon text.

6. The non-transient computer-readable medium of claim 5, said set further comprising instructions for receiving a contemporaneous first-user-persona approval for the respective contemporaneous first-user persona prior to updating the displayed first-user persona with the respective contemporaneous first-user persona and prior to transmitting the respective contemporaneous first-user persona.

7. The non-transient computer-readable medium of claim 5, said set further comprising instructions for receiving a selection corresponding to a displayed instance of first-user content-balloon text that is associated with a previously-displayed first-user persona, and responsively updating the displayed first-user persona with the previously-displayed first-user persona.

8. The non-transient computer-readable medium of claim 5, said set further comprising instructions for creating a textless scene in response to detecting a facial expression or physical gesture of the first user, wherein no first-user content-balloon text is received in connection with the textless scene, such that the textless scene contains a first-user persona representing the first user without associated first-user content-balloon text.

9. A system for combining extracted personas with respective associated content during a chat session, the system comprising:
  at least one computer; and
  a non-transitory computer readable medium having stored thereon one or more programs, which when executed by the computer, cause the computer to:
    display a first-user persona associated with a first user and at least a second-user persona associated with a second user;
    create a plurality of first-user scenes, wherein creating a given first-user scene comprises:
      receiving respective first-user content-balloon text;
      extracting a respective contemporaneous first-user persona from a first video of the first user responsive to receiving the respective first-user content-balloon text; and
      associating the respective contemporaneous first-user persona with the respective first-user content-balloon text so as to associate a respective expression of the first user with the respective first-user content-balloon text;
    transmit the respective first-user content-balloon texts and the respective contemporaneous first-user personas associated with the plurality of first-user scenes into the chat session;
    sequentially display the plurality of first-user scenes, wherein displaying a given first-user scene comprises (i) serially displaying the respective first-user content-balloon text and (ii) updating the displayed first-user persona with the respective contemporaneous first-user persona that is associated with the respective first-user content-balloon text;
    receive a plurality of second-user scenes, wherein a given second-user scene associates a respective contemporaneous second-user persona from a second video of the second user with respective second-user content-balloon text; and
    sequentially display, together with the displayed plurality of first-user scenes, the plurality of second-user scenes, wherein displaying a given second-user scene comprises (i) serially displaying the respective second-user content-balloon text and (ii) updating the displayed second-user persona with the respective contemporaneous second-user persona that is associated with the respective second-user content-balloon text.

10. The system of claim 9, wherein the system is further configured to receive a contemporaneous first-user-persona approval for the respective contemporaneous first-user persona prior to updating the displayed first-user persona with the respective contemporaneous first-user persona and prior to transmitting the respective contemporaneous first-user persona.

11. The system of claim 9, wherein the system is further configured to receive a selection corresponding to a displayed instance of first-user content-balloon text that is associated with a previously-displayed first-user persona, and to responsively update the displayed first-user persona with the previously-displayed first-user persona.

12. The system of claim 9, further comprising one or more programs, which when executed by the computer, cause the computer to create a textless scene in response to detecting a facial expression or physical gesture of the first user, wherein no first-user content-balloon text is received in connection with the textless scene, such that the textless scene contains a first-user persona representing the first user without associated first-user content-balloon text.

* * * * *